US012407522B2

(12) United States Patent
Ansari et al.

(10) Patent No.: US 12,407,522 B2
(45) Date of Patent: Sep. 2, 2025

(54) SYSTEM METHOD FOR VEHICLE BOOTLOADER IMAGE AUTHENTICATION USING RANDOM NUMBER GENERATOR WITH CRYPTOGRAPHIC HASH VALUES

(71) Applicant: HARMAN INTERNATIONAL INDUSTRIES, INCORPORATED, Stamford, CT (US)

(72) Inventors: Asadullah Ansari, Bangalore (IN); Vivek Agrawal, Bangalore (IN); Naveen Thenkani, Bangalore (IN)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 112 days.

(21) Appl. No.: 18/025,093

(22) PCT Filed: Sep. 10, 2020

(86) PCT No.: PCT/US2020/050082
§ 371 (c)(1),
(2) Date: Mar. 7, 2023

(87) PCT Pub. No.: WO2022/055486
PCT Pub. Date: Mar. 17, 2022

(65) Prior Publication Data
US 2023/0327883 A1    Oct. 12, 2023

(51) Int. Cl.
*H04L 9/32* (2006.01)
*G06F 21/57* (2013.01)

(52) U.S. Cl.
CPC .......... *H04L 9/3247* (2013.01); *G06F 21/575* (2013.01); *G06F 2221/034* (2013.01); *H04L 2209/84* (2013.01)

(58) Field of Classification Search
CPC ............................. H04L 9/3247; G06F 21/575
See application file for complete search history.

(56) References Cited

U.S. PATENT DOCUMENTS

| 11,223,486 B2* | 1/2022 | Cheng | H04L 9/0869 |
| 2009/0259854 A1* | 10/2009 | Cox | G06F 21/575 |
| | | | 713/189 |

(Continued)

FOREIGN PATENT DOCUMENTS

CN    102859963 A    1/2013

OTHER PUBLICATIONS

International Search Report and Written Opinion of PCT/US2020/050082 mailed May 26, 2021, 14 pages.

(Continued)

*Primary Examiner* — Tammara R Peyton
(74) *Attorney, Agent, or Firm* — BROOKS KUSHMAN P.C.

(57) ABSTRACT

A bootloader authentication system with a multimedia device to mount within a vehicle, a memory device, and a processor. The memory device stores data indicative of a public key associated with the vehicle and a signed hash bootloader image indicative of a signature of a private key. The processor is in communication with the memory device and is programmed to: generate a signature verification block based on a combination of a random number and the signed hash bootloader image; compare the signature verification block to the public key to verify the signature of the private key; authenticate a bootloader in response to verifying the signature of the private key; and activate the multimedia device in response to bootloader authentication

20 Claims, 4 Drawing Sheets

(56) References Cited

U.S. PATENT DOCUMENTS

2018/0330095 A1    11/2018  Packer et al.
2020/0089507 A1     3/2020  Froehlich et al.

OTHER PUBLICATIONS

First Office Action of Chinese Patent Application No. 202080103875.8 issued Dec. 12, 2024, 18 pages.
First Search of Chinese Patent Application No. 202080103875.8 issued Dec. 12, 2024, 2 pages.
Communication pursuant to Article 94(3) EPC of European patent application No. 20776035.6 dated Jan. 22, 2025.

* cited by examiner

SYSTEM METHOD FOR VEHICLE BOOTLOADER IMAGE AUTHENTICATION USING RANDOM NUMBER GENERATOR WITH CRYPTOGRAPHIC HASH VALUES

CROSS-REFERENCE TO RELATED APPLICATIONS

This application is the U.S. national phase of PCT Application No. PCT/US2020/050082 filed on Sep. 10, 2020, the disclosure of which is hereby incorporated in its entirety by reference herein.

TECHNICAL FIELD

One or more embodiments relate to authenticating an automotive embedded system bootloader.

BACKGROUND

Automotive embedded systems include controllers or control modules for controlling corresponding vehicle systems, such as audio systems, powertrain systems, and navigation systems. Each controller includes a bootloader, and after a vehicle is started, the bootloader performs a boot process to load software into the controller's main memory before it can be executed. The bootloader may perform a secure boot process to authenticate the boot software in a secure manner within an expected timeframe to confirm that the boot software has not been compromised, or "hacked." The secure boot process may include intensive computation to verify the authenticity of the boot software, which results in adding delay to the boot time and restricting access to vehicle systems. For example, after starting a vehicle, a driver may notice a delayed response from an audio system or rear-view camera due to the corresponding system performing an inefficient secure boot process.

SUMMARY

In one embodiment, a bootloader authentication system is provided with a multimedia device to mount within a vehicle, a memory device, and a processor. The memory device stores data indicative of a public key associated with the vehicle and a signed hash bootloader image indicative of a signature of a private key. The processor is in communication with the memory device and is programmed to: generate a signature verification block based on a combination of a random number and the signed hash bootloader image; compare the signature verification block to the public key to verify the signature of the private key; authenticate a bootloader in response to verifying the signature of the private key; and activate the multimedia device in response to bootloader authentication.

In another embodiment, a bootloader authentication system is provided with a multimedia device to mount within a vehicle and a controller to control the multimedia device. The controller is configured to: generate a signature verification block based on a combination of a random number and a signed hash bootloader image indicative of a signature of a private key; compare the signature verification block to a public key associated with the vehicle to verify the signature of the private key; authenticate a bootloader in response to verifying, the signature of the private key; and activate the multimedia device in response to bootloader authentication.

In yet another embodiment, a method for authenticating an automotive embedded system bootloader is provided. Input indicative of a vehicle start is received. A random number is generated in response to the input indicative of the vehicle start. Data is retrieved from memory that is indicative of a public key associated with a vehicle and a signed hash bootloader image indicative of a signature of a private key associated with a multimedia device adapted to mount within the vehicle. A signature verification block is generated based on a combination of the random number and the signed hash bootloader image. The signature verification block is compared to the public key to verify the signature of the private key. A bootloader is authenticated in response to verifying the signature of the private key. The multimedia device is activated in response to the bootloader authentication.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis.

Figure 1:
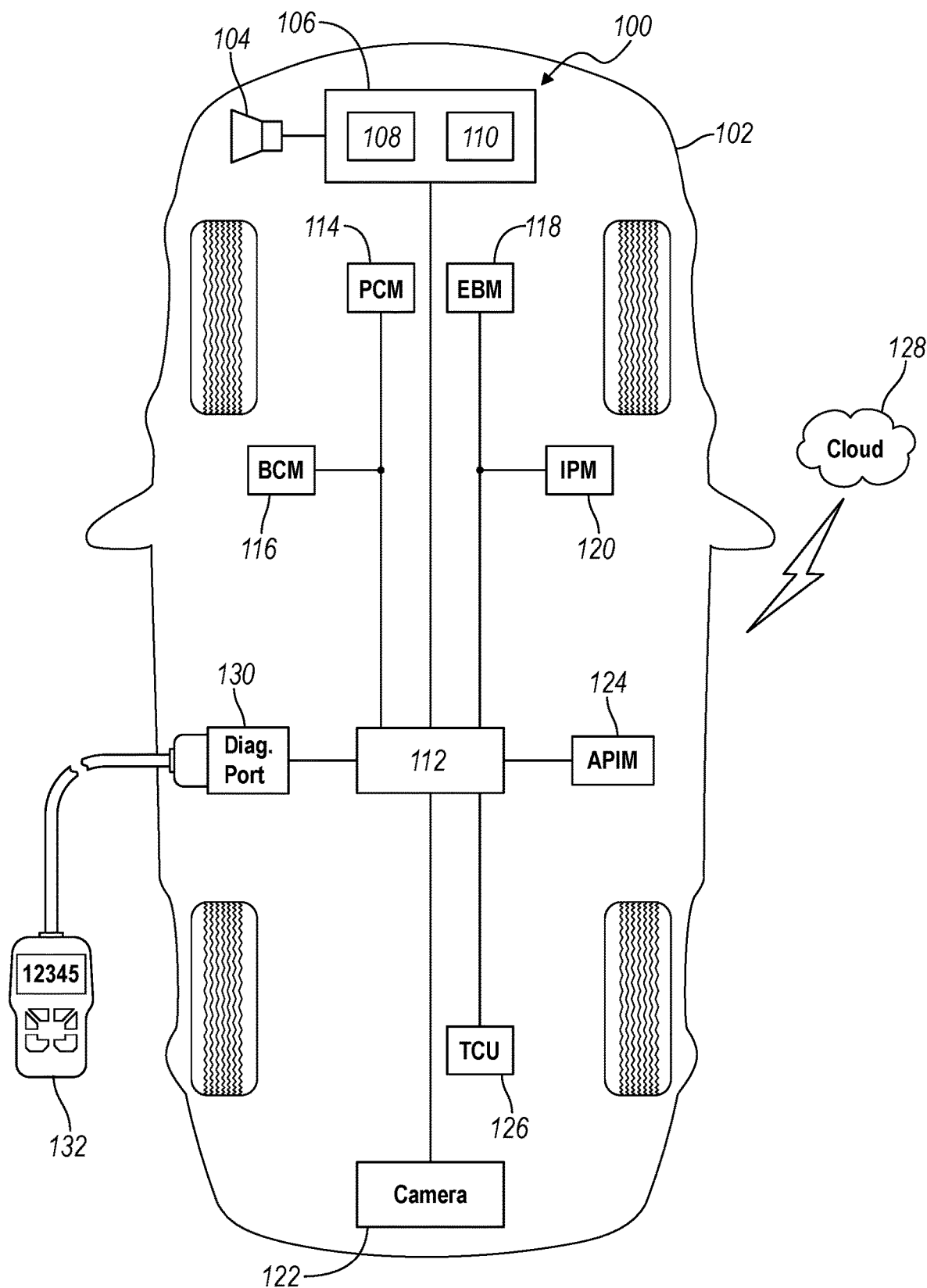
FIG. 1 is a diagram of a vehicle including a digital cockpit, according to one or more embodiments.

With reference to FIG. 1, a digital cockpit is illustrated in accordance with one or more embodiments and is generally represented by numeral 100. A digital cockpit is a modular system that includes the functionality of one or more vehicle systems, such as an audio system, infotainment system, instrument cluster, and advanced driver assistance system (ADAS). The digital cockpit 100 is depicted within a vehicle 102. The digital cockpit 100 includes at least one multimedia device 104, such as a loudspeaker, a camera, a sensor, or a display. The digital cockpit 100 also includes a controller 106. The controller 106 includes a microprocessor 108 and memory 110 that store and execute software for controlling the digital cockpit 100. The controller 106 utilizes an asymmetric cryptography based secure boot method, using a public key to authenticate boot software data signed with a corresponding private key, while minimizing any delay in activating the functionality of the multimedia device 104. Although the asymmetric cryptography based secure boot method is described with reference to the digital cockpit 100, the method may be implemented in any vehicle controller that performs a boot process.

The microprocessor 108 is a system on a chip (SoC), according to one or more embodiments. An SoC is a small integrated circuit, or "chip," that integrates all or most components of a computer, such as a central processing unit (CPU), memory, input/output ports and secondary storage. The memory 110 includes random access memory (RAM, or main memory), read only memory (ROM), and flash memory. The flash memory portion of the memory 110 may include an embedded Multi-Media Controller (eMMC), which refers to a package consisting of both flash memory and a flash memory controller integrated on the same silicon die.

The controller 106 communicates with a plurality of other vehicle controllers, or control modules, over a vehicle network 112. For example, the vehicle 102 may include: a powertrain control module (PCM) 114, a body control module (BCM) 116, an electronic braking module (EBM) 118, and an image processing module (IPM) 120. The PCM 114 may receive a signal that is indicative of the vehicle state, such as: "off", "accessory", "rim" or "start," and provide this signal to other controllers over the vehicle network. The IPM 120 monitors and controls an imaging device, such as a forward-looking camera configured for use in an autonomous driving system, and/or a rearward facing camera for use in a backup camera system 122. In one or more embodiments, the digital cockpit 100 includes the IPM 120. The vehicle network 112 may include one or more channels for communication, such as a Controller Area Network (CAN), a serial network protocol based on Local Interconnect Network (LIN) protocol or Media Oriented Systems Transport (MOST) protocol, and an Ethernet network defined by Institute of Electrical and Electronics Engineers (IEEE) 802 family of standards.

The vehicle 102 also includes control modules that communicate with both internal control modules over the vehicle network 112 and with external devices. For example, the vehicle 102 includes an auxiliary protocol interface module (APIM) 124 that monitors and controls some external inputs to the vehicle network. For example, the APIM 124 may include a BLUETOOTH communications interface for communicating with BLUETOOTH enabled devices (e.g., mobile phone, tablet) and a universal serial bus (USB) interface for communicating with USB enabled devices that are coupled to a USB interface within the vehicle. The APIM 124 may also include a Secure Digital (SD) card interface for exchanging data with SD-cards that are inserted into a vehicle SD interface. The vehicle 102 may also include a telematics control unit (TCU) 126 that monitors and controls communications with a cellular voice and/or data network. The TCU 126 may access media (e.g., movies and/or music) from providers through a cloud-based network 128. In one or more embodiments, the digital cockpit 100 includes the APIM 124 and/or the TCU 126.

The vehicle 102 includes a diagnostic port 130 that also facilitates external access to vehicle control modules over the vehicle network 112. The diagnostic port 130 may include a connector for receiving a mating connector of a scan device 132. A user may initiate communication with one or more of the vehicle controllers via the vehicle network 112 using the scan device 132. If the user is granted access to a control module, then the user can request information from the control module, e.g., diagnostic trouble codes (DTCs). The user may also provide information to the control module, e.g., a new executable program, or new calibration values for an existing program, either of which may affect operation of the controller and impact vehicle performance.

Such external communication with vehicle control modules may allow access for nefarious purposes. For example, a "hacker" having knowledge of vehicle communication protocols could gain entry to the vehicle network 112 and affect vehicle performance. In addition, once the vehicle network 112 is accessed, information about the vehicle owner may he obtained. For example, an electronic module related to cellular communications may store names and phone numbers. In addition, a navigation module may store addresses, including the home address of the vehicle owner. In some cases, an electronic module could be reprogrammed in an undesirable manner. The result is that a "hacker" could compromise vehicle performance in unexpected ways without the vehicle owner knowing.

Each vehicle controller includes a microprocessor and memory that execute programs for controlling the corresponding vehicle system. For example, each controller includes an operating system (OS) and a bootloader. At start-up, the bootloader locates an operating system (OS) kernel, loads it into memory, and performs a boot process. During the boot process, each stage of the software verifies the authenticity of the next stage and establishes a chain of trust. An unauthenticated/malicious bootloader can inject vulnerability in the system and create a backdoor. Moreover, the bootloader can be employed in the unauthorized execution of onboard applications. Thus, a hacker can gain full control over the operations of the vehicle once the bootloader is infected. An infected bootloader may exist for the lifetime of the embedded devices since the bootloader usually remains unaffected during any firmware updates.

Each vehicle controller authenticates its boot software regularly to confirm that the software has not been compromised, or "hacked." For example, each controller may perform a secure boot-up process ("Secure Boot") to authenticate its boot software in response to receipt of an ignition status signal of "run" or "start." During the secure boot process, the controller authenticates its operating system boot image software against the hardware before the controller is allowed to be used in the actual boot process. The controller is set up beforehand in such a way that it only authenticates code generated using trusted security credentials.

A controller may limit or delay the functionality of the corresponding vehicle system while performing the secure boot process. For example, after starting the vehicle 102, the user may immediately shift the transmission into reverse gear and look at a display (not shown) in the vehicle 102 and expect to see an image generated by the rearview backup camera system 122. However, the corresponding vehicle system, e.g., the image processing module (IPM) 120, may delay generation of the image until it has completed its secure boot process. Additionally, a current user may start the vehicle 102 and an existing audio system (not shown) may immediately start playing audio selected during a prior drive cycle, e.g., a radio station at a volume setting when the vehicle 102 was turned off. The current user may be different than the prior user who selected the radio station and volume setting, and the current user may immediately press the audio system power button to turn off the audio. However, the existing audio system controller may delay turning off the audio until it has completed its secure boot process, and such a delay may be inconvenient to the current user.

Figure 2:
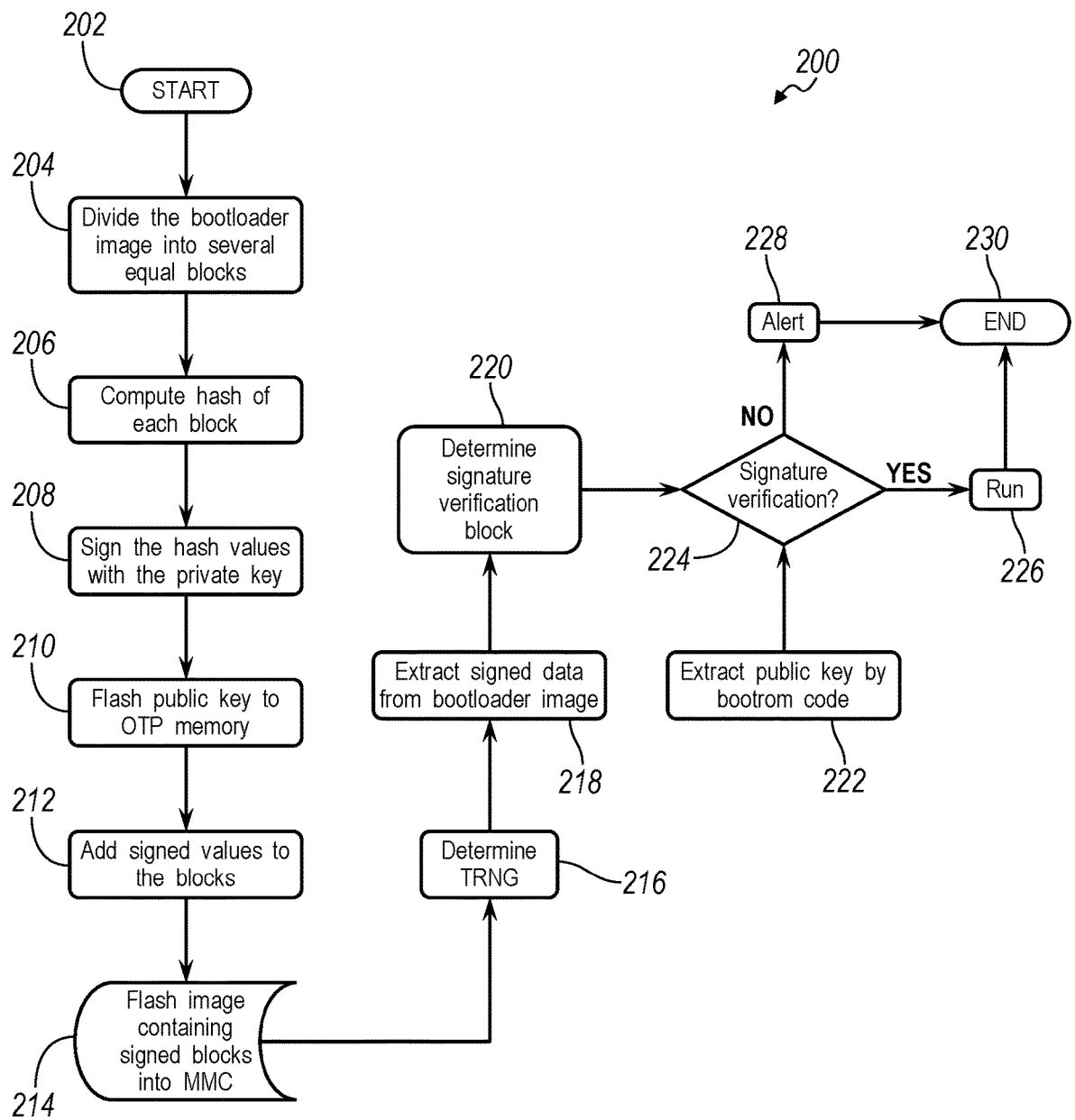
FIG. 2 is a flowchart of a method for authenticating a bootloader of the digital cockpit of FIG. 1.
Figure 3:
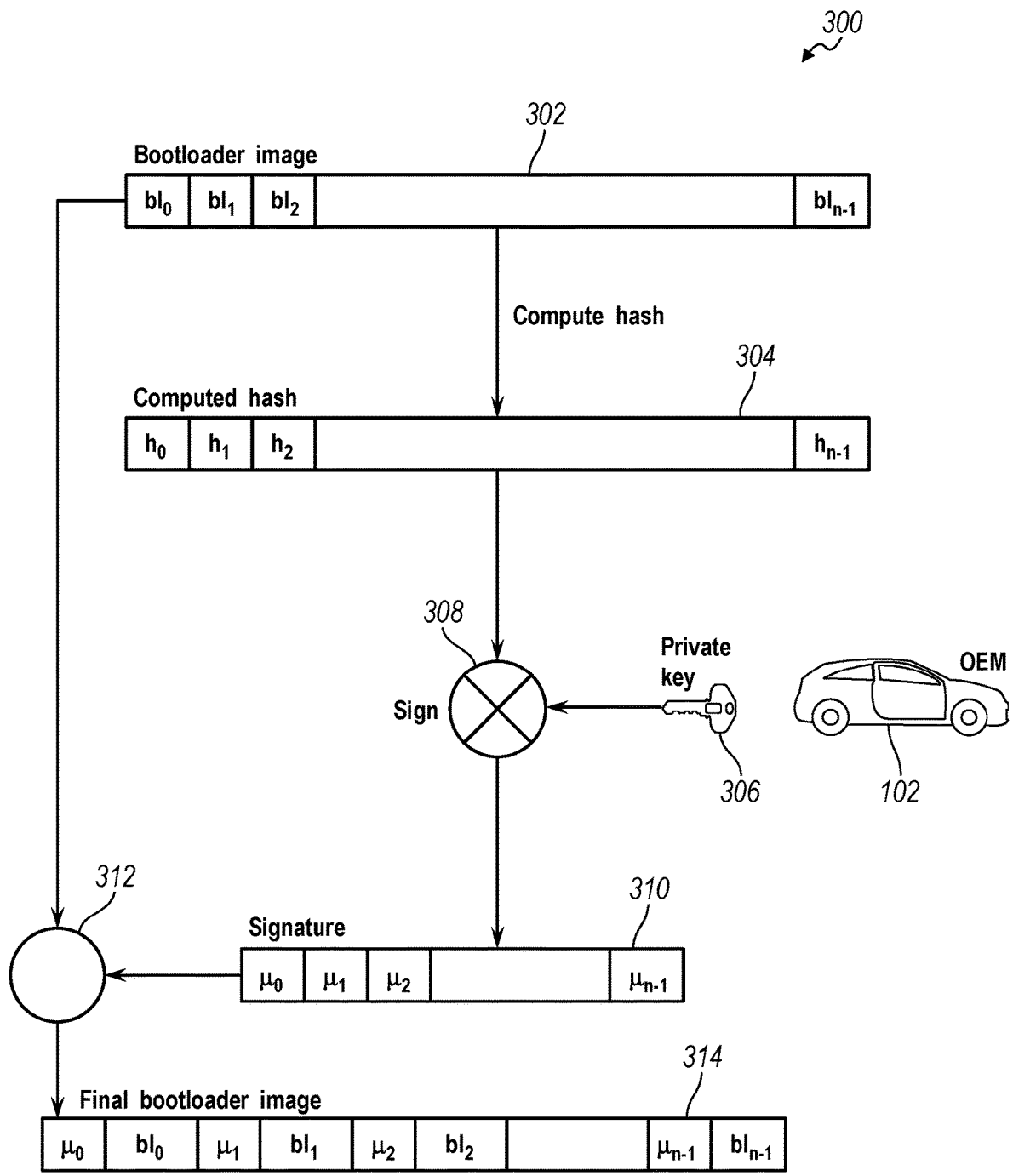
FIG. 3 is a diagram of a signature generation portion of the method of FIG. 2.
Figure 4:
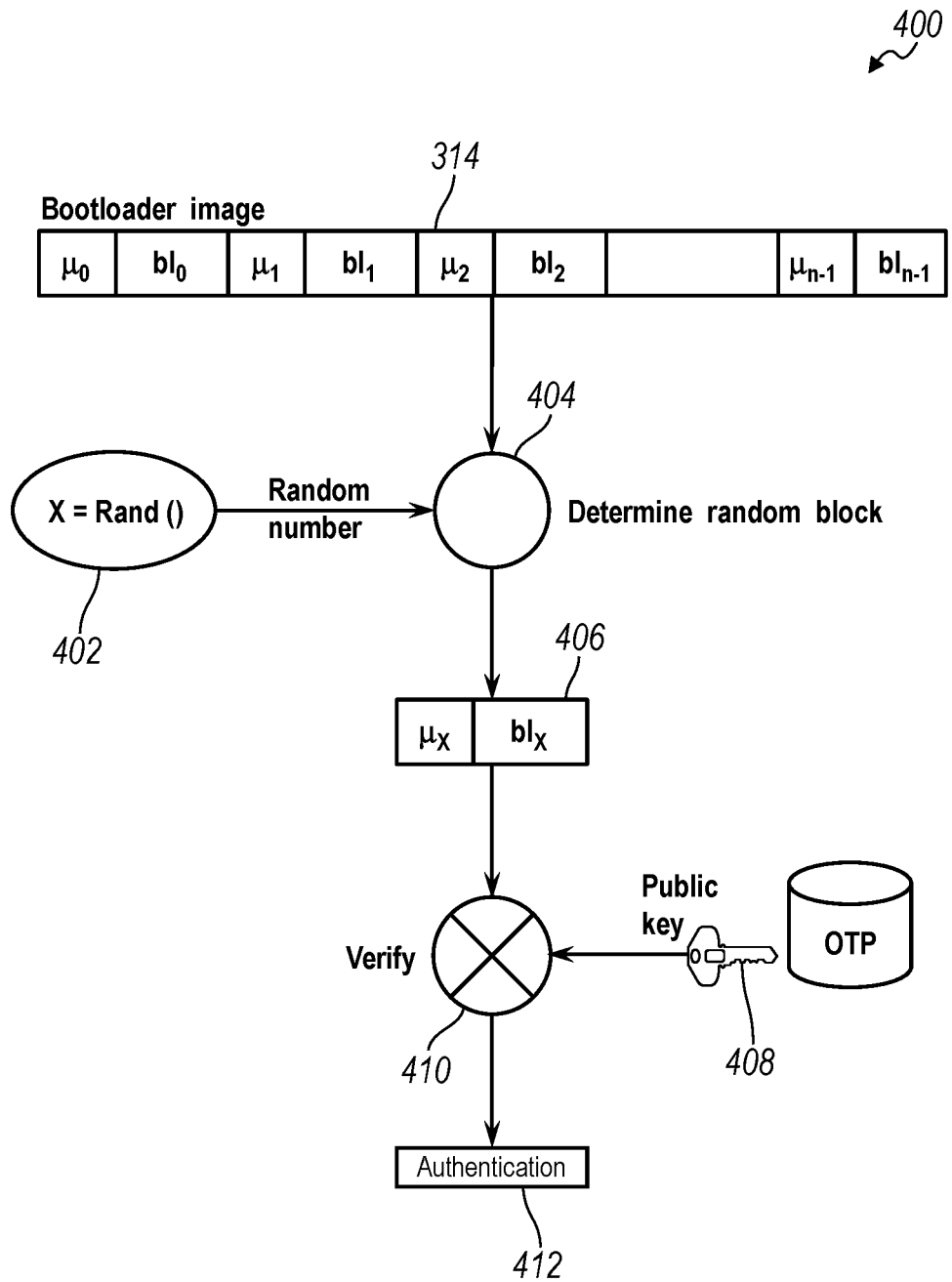
FIG. 4 is a diagram of a signature verification portion of the method of FIG. 2.

With reference to FIG. 2, a method for authenticating boot software is illustrated in accordance with one or more embodiments and referenced by numeral 200. The method 200 includes signature generation steps, and signature verification steps, which relate to the manufacture and implementation of software code contained within the controller 106 of the digital cockpit 100. FIG. 3 is a diagram 300 illustrating the signature generation steps of the method 200, and FIG. 4 is a diagram 400 illustrating the signature verification steps of the method 200. While the method 200 is described using flowcharts that are illustrated with a number of sequential steps, one or more steps may be omitted and/or executed in another manner, or simultaneously in one or more other embodiments. Additionally, although the method 200 is described with reference to the digital cockpit 100, the method 200 may be implemented in any of the vehicle controllers that perform a boot process.

FIGS. 2 and 3 illustrate the signature generation stage of the method 200. At step 202, the signature generation stage is started during the manufacturing of the controller 106. At step 204, a bootloader image is divided into several blocks. The bootloader image may be divided into equal blocks ($bl_0, bl_1, bl_2 \ldots bl_{n-1}$) as illustrated by bootloader image 302 in FIG. 3.

At step 206, a hash of each block (BL) is computed. The hash ($h_0, h_1, h_2, \ldots h_{n-1}$) 304 is illustrated in FIG. 3. The hash of each block may be computed using a cryptographic algorithm, according to one or more embodiments.

At step 208, each hash value is signed with a private key. Referring to FIG. 3, the private key 306 may be provided by the manufacturer of the vehicle 102 according to public key infrastructure (PKI). PKI refers to a set of roles, policies, hardware, software and procedures to create, manage, distribute, use, store and revoke digital certificates and manage public-key encryption. At step 210, the public key is written to a One-Time-Programmable (OTP) portion of the memory 110. OTP memory is a type of non-volatile memory (NVM) that permits data to be written to memory only once. Once the memory has been programmed, it retains its value upon loss of power (i.e., is non-volatile). Additional paired private keys and public keys may be created in steps 208 and 210 to provide backup keys in the event either key is compromised. For example, in one embodiment, each hash value may be signed with four different private keys, and four paired public keys may be written to OTP memory to provide three sets of backup keys. Referring to FIG. 3, the given private key 306 is paired with the corresponding public key, without disclosing the private key. The private key 306 is signed with each hash value at block 308 to form signature block 310.

At step 212 the signed values are added to the bootloader image blocks. Referring to FIG. 3, each block of the bootloader image 302 may be appended to a corresponding signed value of the signature block 310 at block 312 to form a signed hash bootloader image 314.

At step 214, an image containing the signed blocks, i.e., the signed hash bootloader image 314, is stored in the memory 110. In one or more embodiments, an image containing the signed blocks is flashed into the embedded Multi-Media Controller (eMMC) portion of the memory 110.

The pseudo code for the signature generation stage of the method 200, i.e., steps 202-214, may be represented by:

---

1. Bootloader image BL = {$bl_0, bl_1, bl_2, \ldots bl_{n-1}$}
2. Hash h = H(bl)
      $h_0$ = H($bl_0$)
      $h_1$ = H($bl_1$)
      $h_2$ = H($bl_2$)
      $h_{n-1}$ = H($bl_{n-1}$)
3. Digital signature µ= Signature algorithm (h, $K_{priv}$)
4. Output bl' = assemble ([$\mu_0$, $bl_0$], [$\mu_1$, $bl_1$], . . . [$\mu_{n-1}$, $bl_{n-1}$])

---

FIGS. 2 and 4 illustrate the signature verification stage of the method 200 that are performed in response to a vehicle start. At step 216, the controller 106 determines a random number using a true random number generator (TRNG). A TRNG is a device (i.e., hardware) that generates random numbers from a physical process, e.g., statistically random "noise" signals. At step 218, the controller 106 extracts the signed data, i.e., the signed hash bootloader image 314, from the memory 110. At step 220, the controller 106 determines a signature verification block based on the random number and the signed hash bootloader image 314. Referring to FIG. 4, on system boot up, the controller 106 executes the secure boot process (BOOTROM), determines a TRNG 402, and combines the TRNG 402 with the signed hash bootloader image 314 at 404 to determine a single signature verification block 406.

At step 222, the controller 106 retrieves the paired public-key from the memory 110. The paired public-key may be e-fused in the one-time programmable (OTP) portion of the memory 110 during the manufacturing of the controller 106, as represented by step 210. At step 224, the controller 106 compares the single signature verification block to the public key to verify the signature. If the signature is verified, the controller 106 proceeds to step 226 and authenticates the boot software and permits the corresponding system (e.g., the digital cockpit 100) to function. Referring to FIG. 4, the controller 106 compares the signature verification block 406 to the public key 408 to verify the signature at block 410. If the signature is verified, the controller 106 authenticates the boot software 412.

If the signature is not verified, the controller 106 proceeds to step 228 and issues an alert or fault, and/or limits the functionality of the corresponding system. After steps 226 and 228 the controller 106 proceeds to step 230 and ends the boot process.

The psuedo code for steps 214-230 may be represented by:

---

//infinite loop
1. Load bootloader image bl' = ([$\mu_0$, $bl_0$], [$\mu_1$, $bl_1$], . . . [$\mu_{n-1}$, $bl_{n-1}$]
2. Random x = rand ( ) % n
3. Signed block b = bl'[x]
4. Authentication result = signature verification (b, $K_{pub}$)

---

As such, the digital cockpit 100 utilizes an asymmetric cryptography based secure boot method 200, using a public key to authenticate boot software data signed with a corresponding private key, while minimizing any delay in the functionality of the digital cockpit 100. The authentication method 200 quickly ensures the authenticity of the boot software. During the boot up, the secure boot software authenticates the boot software using a signature verification process performed only on the partial data of the boot software, i.e., a single signature verification block, rather than the complete data, thereby increasing the efficiency of the secure boot process. For example, the total number of blocks is defined by the supplier of the microprocessor 108, and may be 16, 32, 64, 128, 256, 512, 1024, 2048, etc. In one embodiment, the total number of blocks is 64, with an image size of 1 MB to 10 MB. Analyzing all 64 blocks using an existing secure boot process may take time (t) however by analyzing a single signature verification block 406, rather than all 64, the digital cockpit 100 may perform the signature verification portion of the method 200 in half the time, i.e., t/2. The signature verification block is determined randomly using a true random number generator, which provides an advanced level of security during the boot up process. By ensuring better security with less usage of hardware computational capability, the digital cockpit 100 may reduce its delay time at start up, while utilizing less complex hardware components within the controller 106 to reduce cost.

While exemplary embodiments are described above, it is not intended that these embodiments describe all possible forms of the present disclosure. Rather, the words used in the specification are words of description rather than limitation, and it is understood that various changes may be made without departing from the spirit and scope of the present disclosure. Additionally, the features of various implementing embodiments may be combined to form further embodiments.

What is claimed is:

1. A bootloader authentication system comprising:
a multimedia device to mount within a vehicle;
a memory device to store data indicative of a public key associated with the vehicle, and a signed hash bootloader image indicative of a signature of a private key, wherein the signed hash bootloader image comprises a plurality of bootloader image blocks and a plurality of cryptographic hash values;
a processor in communication with the memory device, programmed to:
determine a random number using a random number generator;
determine a signature verification block from the plurality of bootloader image blocks using a random number;
compare the signature verification block to the public key to verify the signature of the private key;
authenticate a bootloader in response to verifying the signature of the private key; and
activate the multimedia device in response to bootloader authentication.

2. The bootloader authentication system of claim 1, wherein the signature verification block comprises a single signature verification block.

3. The bootloader authentication system of claim 1, wherein each bootloader image block is appended to a corresponding cryptographic hash value.

4. The bootloader authentication system of claim 3, wherein the plurality of cryptographic hash values is based on the plurality of bootloader image blocks and signed values associated with the signature of the private key.

5. The bootloader authentication system of claim 1, wherein the multimedia device comprises at least one of a loudspeaker, a camera, a sensor, and a display.

6. The bootloader authentication system of claim 1, wherein the public key is paired with the private key.

7. The bootloader authentication system of claim 1, wherein the memory device comprises non-volatile memory and flash memory, and wherein the non-volatile memory stores the data indicative of the public key, and wherein the flash memory stores the data indicative of the signed hash bootloader image indicative of the signature of the private key.

8. The bootloader authentication system of claim 1, wherein the processor is further programmed to generate the signature verification block in response to a vehicle start.

9. A bootloader authentication system comprising:
a multimedia device to mount within a vehicle;
a controller to control the multimedia device, the controller configured to:
generate a signature verification block based on a combination of a random number and a signed hash bootloader image indicative of a signature of a private key, wherein the signed hash bootloader image comprises a plurality of bootloader image blocks, and the signature verification block is one of the plurality of bootloader image blocks;
compare the signature verification block to a public key associated with the vehicle to verify the signature of the private key;
authenticate a bootloader in response to verifying the signature of the private key; and
activate the multimedia device in response to bootloader authentication.

10. The bootloader authentication system of claim 9, wherein the signature verification block comprises a single signature verification block, and wherein the controller is further configured to generate the single signature verification block based on a combination of the random number and a single signed hash bootloader image block.

11. The bootloader authentication system of claim 9, wherein the signed hash bootloader image further comprises a plurality of cryptographic hash values, wherein each bootloader image block is appended to a corresponding cryptographic hash value.

12. The bootloader authentication system of claim 11, wherein the plurality of cryptographic hash values is based on the plurality of bootloader image blocks and signed values associated with the signature of the private key.

13. The bootloader authentication system of claim 9, wherein the public key is paired with the private key.

14. The bootloader authentication system of claim 9, wherein the multimedia device comprises at least one of a loudspeaker, a camera, a sensor, and a display.

15. The bootloader authentication system of claim 9, wherein the controller comprises a processor and a memory device, wherein the memory device comprises:
non-volatile memory to store data indicative of the public key; and
flash memory to store data indicative of the signed hash bootloader image indicative of the signature of the private key.

16. A method for authenticating an automotive embedded system bootloader comprising:
receiving an input indicative of a vehicle start;
generating a random number, in response to the input;
retrieving, from memory, data indicative of a public key associated with a vehicle, and a signed hash bootloader image indicative of a signature of a private key associated with a multimedia device adapted to mount within the vehicle;
generating a signature verification block based on a combination of the random number and the signed hash bootloader image;
comparing the signature verification block to the public key to verify the signature of the private key;
authenticating a bootloader in response to verifying the signature of the private key; and
activating the multimedia device in response to bootloader authentication.

17. The method of claim 16 wherein the signature verification block comprises a single signature verification block, the method further comprising generating the single signature verification block based on a combination of the random number and a single signed hash bootloader image block.

18. The method of claim 16 wherein the signed hash bootloader image comprises a plurality of bootloader image blocks and a plurality of cryptographic hash values, the method further comprising appending each bootloader image block to a corresponding cryptographic hash value.

19. The method of claim 16 further comprising generating the random number from a physical process based on statistically random noise signals.

20. The method of claim 16 further comprising pairing the public key with the private key.

\* \* \* \* \*